United States Patent
Hwang et al.

(10) Patent No.: US 12,202,924 B2
(45) Date of Patent: Jan. 21, 2025

(54) METHOD FOR SEPARATING POLYBUTENE

(71) Applicant: LG CHEM, LTD., Seoul (KR)

(72) Inventors: Woo Sung Hwang, Daejeon (KR); Jeong Seok Lee, Daejeon (KR); Won Hee Kim, Daejeon (KR); Hye Mi Kim, Daejeon (KR); Gyeong Shin Choi, Daejeon (KR); Dong Hyun Jo, Daejeon (KR)

(73) Assignee: LG Chem, Ltd., Seoul (KR)

( * ) Notice: Subject to any disclaimer, the term of this patent is extended or adjusted under 35 U.S.C. 154(b) by 794 days.

(21) Appl. No.: 17/291,955

(22) PCT Filed: Jan. 17, 2020

(86) PCT No.: PCT/KR2020/000851
§ 371 (c)(1),
(2) Date: May 6, 2021

(87) PCT Pub. No.: WO2020/149690
PCT Pub. Date: Jul. 23, 2020

(65) Prior Publication Data
US 2022/0025079 A1  Jan. 27, 2022

(30) Foreign Application Priority Data
Jan. 18, 2019 (KR) .................. 10-2019-0007026

(51) Int. Cl.
*C08F 6/04* (2006.01)
*B01D 3/14* (2006.01)
(Continued)

(52) U.S. Cl.
CPC .............. *C08F 6/12* (2013.01); *B01D 3/148* (2013.01); *C08F 6/001* (2013.01); *C08F 6/04* (2013.01); *C08F 10/08* (2013.01); *C08F 110/10* (2013.01)

(58) Field of Classification Search
CPC ...... C08F 6/04; C08F 6/10; C08F 6/06; C08F 6/08; C08F 6/12; C08F 6/14; C08F 6/16; C08F 6/20; C08F 6/24; C08F 6/26
See application file for complete search history.

(56) References Cited

U.S. PATENT DOCUMENTS

| 4,319,021 A | 3/1982 | Irani et al. | |
|---|---|---|---|
| 6,518,373 B1 * | 2/2003 | Rath | C08F 6/02 526/237 |

(Continued)

FOREIGN PATENT DOCUMENTS

| CN | 105073795 A | 11/2015 |
|---|---|---|
| CN | 105452304 A | 3/2016 |

(Continued)

*Primary Examiner* — Jonathan Luke Pilcher
(74) *Attorney, Agent, or Firm* — Bryan Cave Leighton Paisner LLP

(57) ABSTRACT

A method for separating polybutene, the method including: (1) introducing a polybutene solution into a distillation column, the solution including polybutene, a halogenated hydrocarbon solvent, and a non-polar hydrocarbon solvent and having a viscosity of 1 cp to 50 cp measured at 25° C. using a rotational viscometer; (2) collecting an upper stream including the halogenated hydrocarbon solvent and a portion of the non-polar hydrocarbon solvent from an upper portion of the distillation column, and collecting a lower stream including the polybutene and a remaining portion of the non-polar hydrocarbon solvent from a lower portion of the distillation column, where the lower stream has a viscosity of 10 cp to 150 cp; and (3) separating the remaining portion of the non-polar hydrocarbon solvent and the polybutene from the lower stream.

14 Claims, 1 Drawing Sheet

(51) Int. Cl.
    *C08F 6/00*         (2006.01)
    *C08F 6/10*         (2006.01)
    *C08F 6/12*         (2006.01)
    *C08F 10/08*       (2006.01)
    *C08F 110/10*     (2006.01)

(56) References Cited

U.S. PATENT DOCUMENTS

| | | | |
|---|---|---|---|
| 7,049,383 B2 * | 5/2006 | Auer | C08F 10/10 |
| | | | 526/237 |
| 9,637,576 B2 * | 5/2017 | Kim | B01J 19/1862 |
| 2004/0198937 A1 * | 10/2004 | Auer | C08F 10/10 |
| | | | 526/237 |
| 2005/0234217 A1 | 10/2005 | Bigiavi et al. | |
| 2005/0250917 A1 | 11/2005 | Bigiavi et al. | |
| 2006/0135721 A1 * | 6/2006 | Lange | C08F 10/10 |
| | | | 526/348.7 |
| 2008/0214762 A1 | 9/2008 | Bode et al. | |
| 2008/0249268 A1 | 10/2008 | Rath et al. | |
| 2015/0322181 A1 | 11/2015 | Kim et al. | |
| 2016/0130377 A1 * | 5/2016 | Kim | B01J 19/24 |
| | | | 422/131 |
| 2016/0176994 A1 * | 6/2016 | Kim | C08J 11/02 |
| | | | 422/131 |
| 2016/0208029 A1 * | 7/2016 | Kim | B01D 3/009 |
| 2020/0283550 A1 | 9/2020 | Lee et al. | |
| 2020/0354489 A1 | 11/2020 | Jo et al. | |

FOREIGN PATENT DOCUMENTS

| | | |
|---|---|---|
| EP | 3 663 322 A1 | 6/2020 |
| EP | 3 722 333 A1 | 10/2020 |
| JP | S59219310 A | 12/1984 |
| JP | 2002-161109 A | 6/2002 |
| JP | 2005-530915 A | 10/2005 |
| JP | 2006-131778 A | 5/2006 |
| KR | 10-2005-0016627 A | 2/2005 |
| KR | 10-2008-0028953 A | 4/2008 |
| KR | 10-2008-0056245 A | 6/2008 |
| KR | 10-2017-0074658 A | 6/2017 |
| WO | 2015/016577 A1 | 2/2015 |

\* cited by examiner

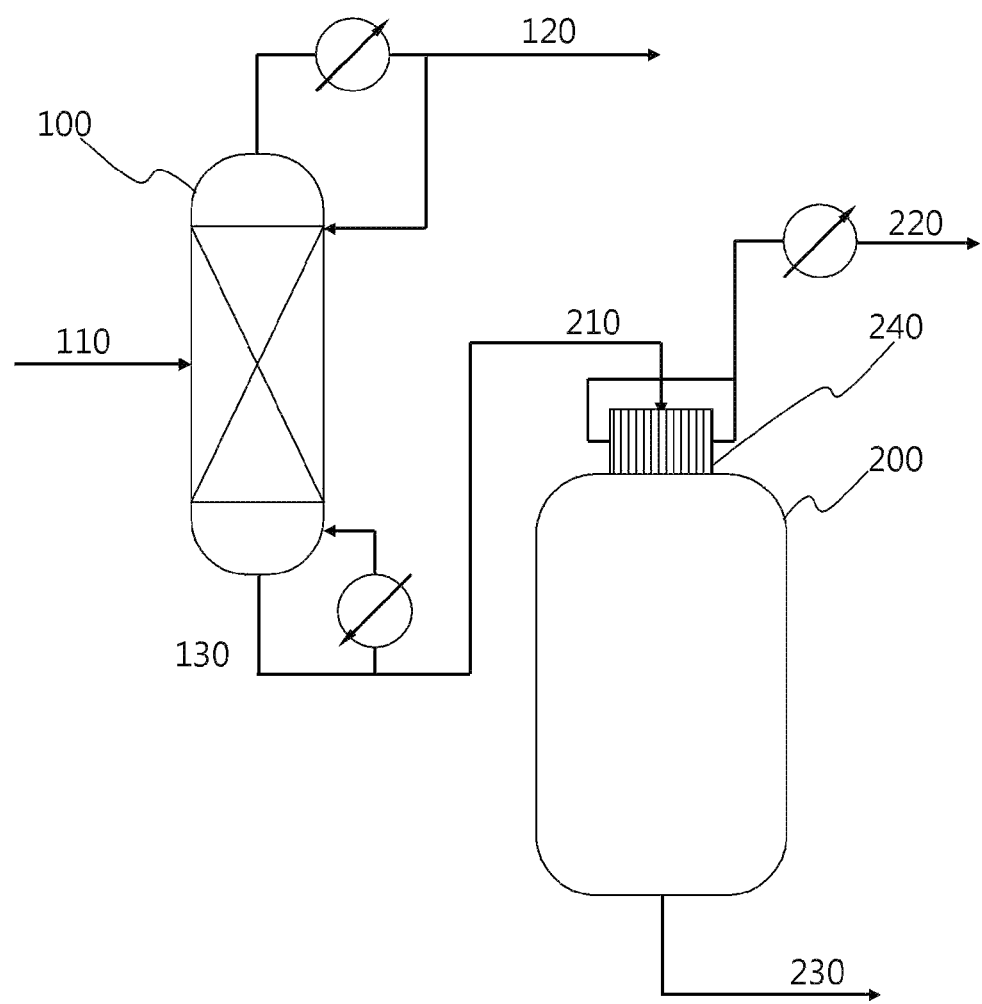

METHOD FOR SEPARATING POLYBUTENE

CROSS-REFERENCE TO RELATED APPLICATIONS

This application is a U.S. national stage of international Application No. PCT/KR2020/000851 filed on Jan. 17, 2020, and claims the benefit of Korean Patent Application No. 10-2019-0007026, filed on Jan. 18, 2019, in the Korean Intellectual Property Office, the disclosures of which are incorporated herein in their entirety by reference.

TECHNICAL FIELD

The present invention relates to a method for separating polybutene, and more specifically to, a method for separating polybutene, a polybutene oligomer or a polymer from a reaction solution including the polybutene oligomer or the polymer which has been subjected to polymerization, the method capable of achieving an extremely small residual content of a specific solvent in a polymer.

BACKGROUND

Polybutene is a compound used as a raw material for various chemical products such as lubricant additives, fuel detergents, and the like.

Polybutene is typically obtained by polymerizing an olefin component having 4 carbon atoms (C4) derived from a decomposition process of naphtha using a Friedel-Craft type catalyst. Raw materials used therefor include C4 raffinate-1, which is obtained by extracting 1,3-butadiene from C4 raw materials, paraffin such as isobutane and normal butane, and olefin such as 1-butene, 2-butene, and isobutene. Since the isobutene having the content of about 30-50 wt % in the olefin component of [sS(1]C4 raffinate-1 has the highest reactivity, polybutene to be produced is composed of mainly isobutene units.

Polyisobutene is classified into low molecular weight, medium molecular weight, and high molecular weight ranges according to a molecular weight range. Polyisobutene of a low molecular weight is in the range of a number average molecular weight of 10,000 or less, and there are product groups of typical polybutene and high reactive polybutene (HR-PB). The highly reactive polybutene has a carbon-carbon double bond mainly positioned at the end of polybutene, and is used as a fuel additive or an engine oil additive after a functional group is introduced using a vinylidene functional group (>80%) of the end.

Polybutene is a liquid oligomer and the viscosity thereof increases with an increase in molecular weight. Polybutene which has been subjected to polymerization is obtained in a mixed solution form with a reaction solvent, and examples of a method for obtaining only the polybutene therefrom may include a method using a distillation column, a method using a flash drum, and a method using a devolatilizer.

Among the above, a distillation column may separate a mixture to high purity using the difference in boiling point, but there are problems in that it is difficult to handle a material having high viscosity and when viscosity increases, separation efficiency is rapidly reduced. Meanwhile, a flash drum or a devolatilizer boils a mixture to remove a low-boiling point material from an upper portion thereof and to obtain the remaining material from a lower portion thereof. Although it is possible to handle a material having high viscosity and equipment cost is low, there is a problem in that it is difficult to achieve high purity separation.

Therefore, there is a demand for developing a separation method capable of separating an oligomer or a polymer and a reaction solvent to high purity, and, in particular, achieving an extremely small residual content of a specific solvent in the oligomer or in the polymer.

SUMMARY

An aspect of the present invention provides a method for separating polybutene, the method capable of separating an oligomer or a polymer from a reaction solution to high purity with excellent separation efficiency.

According to an aspect of the present invention, there is provided a method for separating polybutene, the method including (1) introducing a polybutene solution into a distillation column, the solution including polybutene, a halogenated hydrocarbon solvent, and a non-polar hydrocarbon solvent and having a viscosity of 1 cp to 50 cp measured at 25° C. using a rotational viscometer, (2) separating the halogenated hydrocarbon solvent and the non-polar hydrocarbon solvent from an upper portion of the distillation column, and separating the polybutene solution including the polybutene and the non-polar hydrocarbon solvent and having a viscosity of 10 cp to 150 cp from a lower portion of the distillation column, and (3) separating the non-polar hydrocarbon solvent and the polybutene from the polybutene solution separated from the lower portion of the distillation column through Step (2).

According to a method for separating polybutene of the present invention, a polybutene oligomer or a polymer may be separated with high efficiency from a polybutene solution which has been subjected to polymerization, an extremely small residual content of a solvent included in the polybutene oligomer or in the polymer may be achieved, and the amount of energy consumption used for an entire oligomer or polymer separation process may be reduced, and thus, the method may be usefully used in a preparation process of a polybutene oligomer or a polymer.

BRIEF DESCRIPTION OF THE DRAWINGS

The following drawings attached herein illustrate preferred embodiments of the present invention by example, and serve to enable technical concepts of the present invention to be further understood together with the invention described above, and therefore the present invention should not be interpreted only with matters in such drawings.

The FIGURE is a schematic illustration of an exemplary embodiment of a separation system used for a method for separating polybutene.

DETAILED DESCRIPTION

Hereinafter, the present invention will be described in more detail to facilitate understanding of the present invention.

It will be understood that words or terms used in the specification and claims of the present invention shall not be construed as being limited to having the meaning defined in commonly used dictionaries. It will be further understood that the words or terms should be interpreted as having meanings that are consistent with their meanings in the context of the relevant art and the technical idea of the invention, based on the principle that an inventor may properly define the meaning of the words or terms to best explain the invention.

In the present specification, the term an 'oligomer' means a low polymer formed by oligomerizing a monomer and having a number average molecular weight in the range of less than 10,000.

As a concept relative to the oligomer, a 'polymer' refers to a polymer compound formed by polymerizing monomers and having a number average molecular weight of 10,000 or greater.

The terms "comprising," "including," "having," and the derivatives thereof, whether or not they are specifically disclose, are not intended to exclude the presence of any additional component, step or procedure. In order to avoid any uncertainty, all compositions claimed through the use of the term "comprising," unless otherwise described, whether they are polymers or others, may include any additional additive, supplement, or compound. In contrast, the term "consisting essentially of" excludes any other component, step, or procedure from the scope of any subsequent description, except that it is not essential to operability. The term "consisting of" excludes any component, step or procedure which is not specifically stated or listed.

A method for separating polybutene according to the present invention is characterized by including (1) introducing a polybutene solution into a distillation column, the solution including polybutene, a halogenated hydrocarbon solvent, and a non-polar hydrocarbon solvent and having a viscosity of 1 cp to 50 cp measured at 25° C. using a rotational viscometer, (2) separating the halogenated hydrocarbon solvent and the non-polar hydrocarbon solvent from an upper portion of the distillation column, and separating the polybutene solution including the polybutene and the non-polar hydrocarbon solvent and having a viscosity of 10 cp to 150 cp from a lower portion of the distillation column, and (3) separating the non-polar hydrocarbon solvent and the polybutene from the polybutene solution separated from the lower portion of the distillation column through Step (2).

(1) Step of introducing a polybutene solution into a distillation column, the solution including polybutene, a halogenated hydrocarbon solvent, and a non-polar hydrocarbon solvent and having a viscosity of 1 cp to 50 cp measured at 25° C. using a rotational viscometer.

In Step (1), the polybutene solution introduced into the distillation column is a polybutene solution including polybutene, a halogenated hydrocarbon solvent, and a non-polar hydrocarbon solvent which have been subjected to polymerization, and the solution is not particularly limited as long as it is a solution of a polybutene oligomer or a polymer product obtained by a method for preparing polybutene using isobutene monomers known in the art. In Step (1), a solvent included in the polybutene solution includes a halogenated hydrocarbon solvent and a non-polar hydrocarbon solvent.

In the method for separating polybutene of the present invention, the polymerized polybutene may be obtained by polymerizing a polymerization solution which includes a mixed solvent of a halogenated hydrocarbon solvent and a non-polar hydrocarbon solvent, and isobutene monomers. When the mixed solvent including a halogenated hydrocarbon solvent and a non-polar hydrocarbon solvent is used for the polymerization of polybutene, there is an effect in that the toxicity of the halogenated hydrocarbon solvent is reduced compared with a case in which a halogenated hydrocarbon solvent is used alone.

In addition, during the polymerization of polybutene, the polarity of the solvent affects the reactivity. However, a polybutene oligomer having a low molecular weight range may be obtained by mixing the non-polar hydrocarbon solvent with the halogenated hydrocarbon solvent to control the dielectric constant of the mixed solvent.

The halogenated hydrocarbon solvent may be one or more selected from the group consisting of chloromethane, dichloromethane, trichloromethane, 1-chloro butane and chloro benzene, and the non-polar hydrocarbon solvent may be an aliphatic hydrocarbon solvent, an aromatic hydrocarbon solvent or a mixture thereof. For example, the non-polar hydrocarbon solvent may be one or more selected from the group consisting of butane, pentane, neo pentane, hexane, cyclohexane, methyl cyclohexane, heptane, octane, benzene, toluene, xylene and ethyl benzene. The aliphatic hydrocarbon solvent may be one or more selected from the group consisting of butane, pentane, neopentane, hexane, cyclohexane, methyl cyclohexane, heptane and octane, and the aromatic hydrocarbon solvent may be one or more selected from the group consisting of benzene, toluene, xylene and ethyl benzene.

In the method for separating polybutene of the present invention, the polybutene solution introduced into the distillation column may have a viscosity of 1 cp to 50 cp measured at 25° C. using a rotational viscometer, specifically a viscosity of 2 cp to 40 cp, more specifically a viscosity of 3 cp to 30 cp.

The polybutene solution may have a solid content of wt % to 25 wt %, specifically 10 wt % to 20 wt %, more specifically 15 wt % to 20 wt %.

(2) Step of separating the halogenated hydrocarbon solvent and the non-polar hydrocarbon solvent from an upper portion of the distillation column, and separating the polybutene solution including the polybutene and the non-polar hydrocarbon solvent and having a viscosity of 10 cp to 150 cp from a lower portion of the distillation column In Step (2), the halogenated hydrocarbon solvent is mainly removed by using a distillation column. Specifically, the polybutene solution is introduced into the distillation column, and then the temperature, pressure, and reflux ratio of the distillation column are adjusted to separate the halogenated hydrocarbon solvent and a portion of the non-polar hydrocarbon solvent from an upper portion of the distillation column and to separate the polybutene solution including the polybutene and the non-polar hydrocarbon solvent and having a viscosity of 10 cp to 150 cp from a lower portion of the distillation column.

The removal of the halogenated hydrocarbon solvent is achieved by separating the halogenated hydrocarbon solvent from the upper portion of the distillation column. In Step (2), the halogenated hydrocarbon solvent and a portion of the non-polar hydrocarbon solvent are separated together from the upper portion of the distillation column. When the reflux ratio of the distillation column is increased, the ratio of the halogenated hydrocarbon solvent in a solvent separated from the upper portion of the distillation column may be increased. However, in order to increase the reflux ratio of the distillation column, a large amount of energy is used, and thus, in order to separate mainly the halogenated hydrocarbon solvent from the upper portion of the distillation column, a large amount of energy is used for distillation to increase the reflux ratio of the distillation column. On the other hand, when the reflux ratio of the distillation column is decreased, the halogenated hydrocarbon solvent may remain in the polybutene solution separated from the lower portion of the distillation column.

Therefore, in Step (2), the reflux ratio of the distillation column should be adjusted such that the amount of the halogenated hydrocarbon solvent remaining in polybutene to be finally separated is adequately reduced and energy is not unnecessarily consumed.

In Step (2), the reflux ratio of the distillation column may be 0.1 to 1, specifically 0.2 to 1, more specifically 0.2 to 0.4. When the reflux ratio of the distillation column satisfies the above range, the amount of the halogenated hydrocarbon solvent included in the polybutene solution separated from the lower portion of the distillation column is reduced to an adequate degree, so that the residual content of the halogenated hydrocarbons included in polybutene to be finally obtained is extremely small.

When the reflux ratio of the distillation column satisfies the above range, the solvent separated from the upper portion of the distillation column in Step (2) includes a halogenated hydrocarbon solvent and a non-polar hydrocarbon solvent. The halogenated hydrocarbon solvent and the non-polar hydrocarbon solvent may have a weight ratio of 20:80 to 80:20, and specifically a weight ratio of 30:70 to 80:20, and more specifically a weight ratio of 40:60 to 70:30.

In Step (2), the temperature of the upper portion of the distillation column may be 50° C. to 70° C. and the temperature of the lower portion of the distillation column may be 85° C. to 105° C. Specifically, the temperature of the upper portion of the distillation column may be 54° C. to 66° C. and the temperature of the lower portion thereof may be 85° C. to 102° C. More specifically, the temperature of the upper portion of the distillation column may be 54.2° C. to 66.0° C. and the temperature of the lower portion thereof may be 85.8° C. to 101.8° C.

In addition, the pressure of the distillation column in Step (2) may be 1.5 bar to 3 bar, specifically 1.5 to 2.5 bar, and more specifically 1.5 bar to 2 bar.

Meanwhile, the temperature of the distillation column may be determined according to the pressure of the distillation column. According to an embodiment of the present invention, when the pressure of the column is 1.5 bar, the temperature of the upper portion of the distillation column may be 54.2° C. to 56.6° C. and the temperature of the lower portion thereof may be 85.8° C. to 90.6° C. When the pressure of the column is 2.0 bar, the temperature of the upper portion of the distillation column may be 63.5° C. to 66.0° C.° and the temperature of the lower portion thereof may be 96.5° C. to 101.8° C. The temperature of the distillation column may be adjusted according to the viscosity and the solid content of the polybutene solution. For example, the temperature of the column may increase as the viscosity and the solid content of the polybutene solution increases.

When the temperature, pressure, and reflux ratio of the distillation column satisfy the above range, a polybutene solution including polybutene and a non-polar hydrocarbon solvent and having a viscosity of 10 cp to 150 cp may be separated from the lower portion of the distillation column. The viscosity of the polybutene solution may be specifically 15 cp to 120 cp, more specifically, 20 cp to 100 cp. The solid content of the polybutene solution including the polybutene and the non-polar hydrocarbon solvent may be 40 wt % to 60 wt %, specifically 40 wt % to 55 wt %, and more specifically 43 wt % to 50 wt %.

The polybutene solution separated from the lower portion of the distillation column may satisfy the viscosity and the solid content in the above range. When the above range is satisfied, separation of the polybutene and the non-polar hydrocarbon solvent and the halogenated hydrocarbon solvent through the distillation column may be adequately achieved, and when the viscosity of the polybutene solution separated from the lower portion of the distillation column increases, a problem in which the separation efficiency of the distillation column is reduced and the operation thereof becomes difficult may not occur.

The method for separating polybutene of the present invention separates a halogenated hydrocarbon solvent through an upper portion of the distillation column and allows a sufficient amount of solution to be separated together from a lower portion thereof in addition to polybutene, thereby allowing the polybutene solution to maintain a low viscosity, so that when the viscosity of a polybutene solution separated from the lower portion increases, it is possible to prevent the separation efficiency of the distillation column from being reduced and the operation thereof from becoming difficult. That is, the method for separating polybutene of the present invention includes a process of effectively removing a halogenated hydrocarbon solvent from the upper portion of the distillation column without an input of an excessive energy by means of adjusting the pressure, temperature, and reflux ratio of the distillation column, and of adjusting such that a non-polar hydrocarbon solvent is sufficiently included in polybutene so that a polybutene solution having the viscosity of the above range may be separated from the lower portion of the distillation column.

(3) Step of separating the non-polar hydrocarbon solvent and the polybutene from the polybutene solution separated from the lower portion of the distillation column through Step (2). The polybutene solution separated from the lower portion of the distillation column through Step (2) is a solution from which a halogenated hydrocarbon solvent is primarily separated and a non-polar hydrocarbon solvent remaining in the solution may be removed in Step (3).

The step of separating the non-polar hydrocarbon solvent and the polybutene from the polybutene solution separated from the lower portion of the distillation column may be performed, for example, using a devolatilizer. When the non-polar hydrocarbon solvent and the polybutene are separated using the devolatilizer, the non-polar hydrocarbon solvent may be separated from an upper portion of the devolatilizer, and the polybutene having a high viscosity may be separated from a lower portion of the devolatilizer.

In an embodiment of the present invention, the temperature of the devolatilizer may be 180° C. to 320° C. and the pressure thereof may be 0.4 bar to 1.2 bar. Specifically, the temperature of the devolatilizer may be 200° C. to 300° C. and the pressure thereof may be 0.5 bar to 1 bar. When the pressure of the devolatilizer decreases, the energy used to increase the temperature decreases, but a droplet accompaniment phenomenon occurs in which a polymer rises upwards, and when the pressure of the devolatilizer increases, the droplet accompaniment phenomenon in which the polymer rises upwards decreases, but the energy used to increase the temperature increases. Therefore, the pressure of the devolatilizer may be adjusted to satisfy the above pressure range. In addition, the temperature of the devolatilizer may be adjusted according to the pressure. When the pressure decreases, the temperature may decrease, and when the pressure increases, the temperature may increase. The pressure may be adequately adjusted within the above temperature range.

The polybutene solution separated from the lower portion of the distillation column may be heated before being introduced into the devolatilizer. Therefore, the present invention may additionally include a step of passing the polybutene solution separated from the lower portion of the distillation column through a pre-heater before introducing the same into the devolatilizer. By passing the polybutene solution through the pre-heater, the amount of heat required to vaporize the non-polar hydrocarbon solvent included in the polybutene solution may be supplied.

The polybutene solution separated from the lower portion of the distillation column in Step (2) is a solution from which a halogenated hydrocarbon solvent is separated through the distillation column, but may include a portion of the halogenated hydrocarbon solvent. For example, the polybutene solution separated from the lower portion of the distillation column may include, for example, a halogenated hydrocarbon solvent of 100 ppm to 5,000 ppm, specifically a halogenated hydrocarbon solvent of 300 ppm to 3,000 ppm, and more specifically, a halogenated hydrocarbon solvent of 500 ppm to 1,000 ppm. The halogenated hydrocarbon solvent included in the polybutene solution may be further removed from the polybutene together with the non-polar hydrocarbon solvent in the step of separating the non-polar hydrocarbon solvent and the polybutene of Step (3).

As such, the polybutene separated in Step (3) may include a halogenated hydrocarbon solvent of 5 ppm or less and a non-polar hydrocarbon solvent of 0.05 wt % or less, specifically a halogenated hydrocarbon solvent of 1 ppm to 5 ppm and a non-polar hydrocarbon solvent of 0.01 wt % to 0.05 wt %.

The FIGURE is an exemplary embodiment of a separation system used for a method for separating polybutene.

As shown in the FIGURE, the separation system used for the method for separating polybutene according to an embodiment of the present invention includes a distillation column 100 and a devolatilizer 200. According to an embodiment, a polybutene solution including polybutene, a halogenated hydrocarbon solvent, and a non-polar hydrocarbon solvent and having a solid content of 10 wt % to 25 wt % is introduced into the distillation column 100 through a first supply line 110. On an upper portion of the distillation column 100, a first solvent discharge line 120 is positioned, through which the halogenated hydrocarbon solvent and the non-polar hydrocarbon solvent are separated and discharged. On a lower portion of the distillation column 100, a first discharge line 130 is positioned, through which a polybutene solution including the polybutene and the non-polar hydrocarbon solvent and having a solid content of 40 wt % to 60 wt % is discharged. The polybutene solution discharged from the first discharge line 130 is introduced into the devolatilizer 200 through a second supply line 210 connected to the devolatilizer 200, and may be heated by being passed through a pre-heater 240 before being introduced into the devolatilizer 200. On an upper portion of the devolatilizer 200, a second solvent discharge line 220 is positioned, through which the non-polar hydrocarbon solvent is separated and discharged, and on a lower portion of the devolatilizer 200, a second discharge line 230 is positioned, through which the polybutene is separated and discharged.

EXAMPLES

Hereinafter, the present invention will be described in more detail with reference to Examples and Experimental Examples. However, the present invention is not limited by these Examples and Experimental Examples. The embodiments according to the present invention may be modified into other various forms, and the scope of the present invention should not be construed as being limited to the embodiments described below. The embodiments of the present invention are provided to more fully describe the present invention to those skilled in the art.

In the following Examples and Comparative Examples, the separation method according to the present invention was simulated using Aspen Plus, which is a commercial process simulation program. As constants required for the simulation, values embedded on the program, values described in the literature, and the like were used.

Polymerization Example: Preparation of Polybutene 1,000 kg/hr of isobutylene which is a monomer, 1,600 kg/hr of dichloromethane which is a solvent, and 2,400 kg/hr of n-hexane were introduced into a reactor to perform continuous polymerization. When the polymerization was completed, a catalyst was removed by being passed through an adsorption tower, through which a polymer solution was obtained after the polymerization. The polymer solution had a 1,000 kg/hr of polymers, 1,600 kg/hr of dichloromethane, and 2,400 kg/hr of n-hexane. The viscosity of the polymer solution measured at 25° C. using a rotational viscometer was 30 cp.

Example 1

In order to separate a solvent and a polymer, the polymer solution obtained in Polymerization Example above was introduced into a distillation column. At this time, the temperature, pressure, and reflux ratio of the column were adjusted to a column pressure of 1.5 bar, a column upper portion/lower portion temperature of 54.2° C./85.8° C., and a reflux ratio of 0.2 to obtain 1,600 kg/hr of dichloromethane (DCM) and 900 kg/hr of n-hexane from an upper portion of the distillation column. In this case, from a lower portion of the distillation column, 1,000 kg/hr of polybutene polymers and the remaining 1,500 kg/hr of n-hexane were obtained. The polybutene polymer solution obtained from the lower portion was passed through a pre-heater and then introduced into a devolatilizer. Temperature and pressure conditions were 200° C. and 0.5 bar. 999.5 kg/hr of n-hexane was obtained from an upper portion of the devolatilizer and polybutene polymers were obtained from a lower portion thereof. In this case, the content of the DCM in the polymers was 5 ppm based on the total content of the polymers, and the content of the n-hexane was 0.05 wt %.

Example 2

A process was performed in the same manner as in Example 1 except that the reflux ratio was adjusted to 0.1. 1,600 kg/hr of dichloromethane (DCM) and 900 kg/hr of n-hexane were obtained from the upper portion of the distillation column and 1,000 kg/hr of polybutene polymers and the remaining 1,500 kg/hr of n-hexane were obtained from the lower portion of the distillation column. 999.5 kg/hr of n-hexane was obtained from the upper portion of the devolatilizer and polybutene polymers were obtained from the lower portion thereof. The content of the DCM in the polymers was 10 ppm based on the total content of the polymers, and the content of the n-hexane was 0.05 wt %.

Example 3

A process was performed in the same manner as in Example 1 except that the reflux ratio was adjusted to 0.4. 1,600 kg/hr of dichloromethane (DCM) and 900 kg/hr of n-hexane hexane were obtained from the upper portion of the distillation column and 1,000 kg/hr of polybutene polymers and the remaining 1,500 kg/hr of n-hexane were obtained from the lower portion of the distillation column. 999.5 kg/hr of n-hexane was obtained from the upper portion of the devolatilizer and polybutene polymers were obtained from the lower portion thereof. The content of the DCM in the polymers was 5 ppm based on the total content of the polymers, and the content of the n-hexane was 0.05 wt %.

Example 4

A process was performed in the same manner as in Example 1 except that the reflux ratio was adjusted to 0.8. 1,600 kg/hr of dichloromethane (DCM) and 900 kg/hr of n-hexane were obtained from the upper portion of the distillation column and 1,000 kg/hr of polybutene polymers and the remaining 1,500 kg/hr of n-hexane were obtained from the lower portion of the distillation column. 999.5 kg/hr of n-hexane was obtained from the upper portion of the devolatilizer and polybutene polymers were obtained from the lower portion thereof. The content of the DCM in the polymers was 1.5 ppm based on the total content of the polymers, and the content of the n-hexane was 0.05 wt %.

Example 5

A process was performed in the same manner as in Example 1 except that the reflux ratio was adjusted to 1.0. 1,600 kg/hr of dichloromethane (DCM) and 900 kg/hr of n-hexane were obtained from the upper portion of the distillation column and 1,000 kg/hr of polybutene polymers and the remaining 1,500 kg/hr of n-hexane were obtained from the lower portion of the distillation column. 999.5 kg/hr of n-hexane was obtained from the upper portion of the devolatilizer and polybutene polymers were obtained from the lower portion thereof. The content of the DCM in the polymers was 5 ppm based on the total content of the polymers, and the content of the n-hexane was 0.05 wt %.

Example 6

In order to separate a solvent and a polymer, the polymer solution obtained in Polymerization Example above was introduced into a distillation column. At this time, the temperature, pressure, and reflux ratio of the column were adjusted to a column pressure of 1.5 bar, a column upper portion/lower portion temperature of 56.6° C./90.6° C., and a reflux ratio of 0.2 to obtain 1,600 kg/hr of DCM and 1,730 kg/hr of n-hexane from an upper portion of the distillation column. In this case, from a lower portion of the distillation column, 1,000 kg/hr of polymers and the remaining 670 kg/hr of n-hexane were obtained. The polybutene polymer solution obtained from the lower portion was passed through a pre-heater and then introduced into a devolatilizer. Temperature and pressure conditions were 200° C. and 0.5 bar. 999.5 kg/hr of n-hexane was obtained from an upper portion of the devolatilizer and polybutene polymers were obtained from a lower portion thereof. In this case, the content of the DCM in the polymers was 5 ppm based on the total content of the polymers, and the content of the n-hexane was 0.05 wt %.

Example 7

In order to separate a solvent and a polymer, the polymer solution obtained in Polymerization Example above was introduced into a distillation column. At this time, the temperature, pressure, and reflux ratio of the column were adjusted to a column pressure of 1.5 bar, a column upper portion/lower portion temperature of 51.6° C./84.6° C., and a reflux ratio of 3.0 to obtain 1,000 kg/hr of polymers and 2,250 kg/hr of n-hexane from a lower portion of the distillation column, thereby obtaining a solid content of 30 wt %. In this case, from an upper portion of the distillation column, 1,600 kg/hr DCM and the 150 kg/hr of n-hexane were obtained. In order to obtain mainly DCM from the upper portion of the distillation column while not leaving DCM from the lower portion thereof, the reflux ratio had to be increased, and thus, a large amount of energy was introduced. Thereafter, the polymer solution was passed through a pre-heater and then introduced into a devolatilizer, and temperature and pressure conditions were the same as in Example 1. The content of DCM and the content of n-hexane in the polybutene polymers of the lower portion were the same as in Example 1.

Example 8

A process was performed in the same manner as in Example 1 except that the reflux ratio was adjusted to 0.08. 1,600 kg/hr of dichloromethane (DCM) and 900 kg/hr of n-hexane were obtained from the upper portion of the distillation column and 1,000 kg/hr of polybutene polymers and the remaining 1,500 kg/hr of n-hexane were obtained from the lower portion of the distillation column. 999.5 kg/hr of n-hexane was obtained from the upper portion of the devolatilizer and polybutene polymers were obtained from the lower portion thereof. The content of the DCM in the polymers was 20 ppm based on the total content of the polymers, and the content of the n-hexane was 0.05 wt %.

Comparative Example 1

The polymer solution obtained in Polymerization Example above was introduced into a flash drum instead of a distillation column. The temperature and pressure of the flash drum were adjusted to 71.5° C. and 1.5 bar to obtain 1,000 kg/hr of polymers and 1,000 kg/hr of a solvent from a lower portion of the flash drum. At this time, about 200 kg/hr of DCM and about 800 kg/hr of n-hexane were present in the solvent. The polymer solution obtained from the lower portion was passed through a pre-heater and then introduced into a devolatilizer in the same manner as in Example 1. Temperature and pressure conditions were the same as in Example 1. Polymers were obtained from a lower portion of the devolatilizer, and in this case, the content of the DCM in the polymers was about 60 ppm based on the total content of the polymers, and the content of the n-hexane was 0.05 wt %.

Comparative Example 2

The polymer solution obtained in Polymerization Example above was introduced into a distillation column in the same manner as in Example 1. At this time, the temperature, pressure, and reflux ratio of the column were adjusted to a column pressure of 1.5 bar, a column upper portion/lower portion temperature of 58.6° C./150° C., and a reflux ratio of 0.2 to obtain polymers from a lower portion of the distillation column, and the content of the DCM in the polymers was 5 ppm based on the content of the polymers, and the content of the n-hexane was 15 wt %. When polymers were obtained from the lower portion, the solid content was 85 wt % and the viscosity was very high at 1,500 cp.

Experimental Example

<Measurement of Viscosity>

Viscosity was measured for the polybutene polymer solution obtained from a lower portion of a distillation column or of a flash drum in each of Examples 1 to 8 and Comparative Examples 1 and 2.

The viscosity measurement was performed by mounting a spindle for measuring a shear rate 100/s using a Brookfield viscometer, and then immersing the spindle in a container containing each polybutene polymer solution. Thereafter, the viscosity was measured for about 1 minute at 25° C. The viscosity measurement results are shown in Table 1 below.

<Measurement of DCM Content and n-Hexane Content in Polymer>

The content of DCM and the content of n-hexane in the polymers obtained in Examples 1 to 8 and Comparative Examples 1 and 2 were analyzed using gas chromatography (GC/FID, GC-03).

<Amount of Steam Energy Used>

Under the corresponding process conditions of each of Examples 1 to 8 and Comparative Examples 1 and 2, the amount of heat (duty) required was calculated by Aspen Plus and converted into required steam energy. 2 kg/hr of steam energy was required per calorie of 1 Mcal/hr.

<Device Cleaning Cycle>

A device cleaning cycle was measured at the time of separating the polybutene according to each of Examples 1 to 8 and Comparative Examples 1 and 2 and the results are shown in Table 1 below. The device cleaning cycle was determined based on the measurement of the time when polymer deposition gradually progressed in a reboiler of a distillation column, a devolatilizer, or a pre-heater of a flash drum, so that it was impossible to control a heat exchanger to a target temperature.

TABLE 1

|  | Device configuration | Viscosity of polybutene solution (cp) | Reflux ratio | DCM content in polymer (ppm) | N-hexane content in polymer (ppm) | Steam Energy Amount used (Kg/hr) | Device Cleaning cycle (Times/year) |
|---|---|---|---|---|---|---|---|
| Example 1 | Distillation Column + Devolatilizer | 30 | 0.2 | 5 | 0.05 | 500 | 2 |
| Example 2 | Distillation Column + Devolatilizer | 30 | 0.1 | 10 | 0.05 | 480 | 2 |
| Example 3 | Distillation Column + Devolatilizer | 30 | 0.4 | 3 | 0.05 | 540 | 2 |
| Example 4 | Distillation Column + Devolatilizer | 30 | 0.8 | 1.5 | 0.05 | 625 | 2 |
| Example 5 | Distillation Column + Devolatilizer | 30 | 1.0 | 1 | 0.05 | 670 | 2 |
| Example 6 | Distillation Column + Devolatilizer | 140 | 0.2 | 5 | 0.05 | 480 | 3 |
| Example 7 | Distillation Column + Devolatilizer | 20 | 3.0 | 5 | 0.05 | 1,500 | 2 |
| Example 8 | Distillation Column + Devolatilizer | 30 | 0.08 | 20 | 0.05 | 475 | 2 |
| Comparative Example 1 | Flash drum + Devolatilizer | 100 | — | 60 | 0.05 | 450 | 1 |
| Comparative Example 2 | Distillation Column | 1500 | 0.2 | 5 | 15 | 550 | 20 |

The device was stabilized and a standard sample (DCM or n-hexane) was injected to prepare a calibration curve, and then the sample was injected and the content was calculated by using the calibration curve.

GC/FID Conditions

Method type: Measurement method—Quantitative analysis

Column: DB-5 (0.53 mm ID×30 mL, 1.5 μm d.f. capillary)

Oven temperature: Initial Value & Time: 50° C., 5 min
Program Rate: 15° C./min
Final Value & Time: 300° C., 10 min
Detector temperature: 300° C.
Gas Flow rate: Column(He): 5 mL/min
Injector: on column
Injection volume: 0.2 μL Referring to Table 1 above, the method of each of Examples 1 to 8 achieved a low DCM content and a low n-hexane content in the polymers at the same time. However, when a flash drum instead of a distillation column was used as in Comparative Example 1, the content of DCM in the polymers was high, and when only a distillation column was used as in Comparative Example 2, the content of DCM in the polymers was reduced, but the content of n-hexane was increased, and the viscosity of polymers obtained from the lower portion of the distillation column was high, so that polymer deposition in the device has high viscosity, thereby aggravating polymer deposition in the device, so that there was a disadvantage in that the device washing cycle was shortened. Therefore, it can be confirmed that when the method for separating polybutene according to an embodiment of the present invention is used, while the residual solvent may be effectively separated from polybutene to be produced, a problem caused by polymer deposition occurring when the viscosity of polybutene polymers obtained from the lower portion of the distillation column is high may also be solved.

Meanwhile, reviewing the results of Examples 1 to 8, in the case of Example 6, the viscosity of the polybutene solution obtained from the lower portion of the distillation column was 140 cp before being introduced into the devolatilizer. In this case, when compared with Examples 1 to 5, 7 and 8 which have a viscosity of 20 to 30 cp, deposition of the polymers was increased, so that the cleaning cycle of the device was increased from twice a year to three times a year. Therefore, it can be confirmed that the viscosity of the polybutene solution obtained from the lower portion of the distillation column is additionally adjusted as needed in order to reduce the cleaning cycle of the device.

Also, in the case of Example 7, it was possible to achieve a low DCM content and a low n-hexane content in the polymer finally produced and the device cleaning cycle was maintained at a low level. However, a large amount of steam energy was used since the reflux ratio was increased to separate DCM and n-hexane respectively from the upper portion and the lower portion of the distillation column to the maximum purity. In the case of Example 8, although the amount of steam energy used was similar to those of Examples 3 and 4, the DCM content of the polymers finally produced was relatively high to 20 ppm. Therefore, it was confirmed that it may be necessary to further adjust the processing conditions to obtain an adequate reflux ratio to reduce the amount of energy consumed in the entire oligomer or polymer separation process and to effectively remove the DCM.

Therefore, through the method of the present invention in which a halogenated hydrocarbon solvent and a non-polar hydrocarbon solvent and a polybutene solution having a viscosity of 10 cp to 150 cp are primarily separated from a polybutene solution including polybutene, the halogenated hydrocarbon solvent and the non-polar hydrocarbon solvent, and in which the non-polar hydrocarbon solvent and the polybutene are separated from the polybutene solution having a viscosity of 10 cp to 150 cp, the halogenated hydrocarbon solvent included in the polybutene solution may be reduced to a minimum. Furthermore, of the processing, through a process in which the viscosity of the polybutene solution obtained from the lower portion of the distillation column is adjusted and a process in which the reflux ratio of the distillation column is adjusted, energy consumption may be reduced to a minimum, and the problem of polymer deposition in the device due to the high viscosity of the polymers obtained from the lower portion of the distillation column may be solved, exerting an additional excellent effect of increasing the device cleaning cycle of the device as well.

EXPLANATION OF SYMBOL

100: a distillation column 110: a first supply line
120: a first solvent discharge line 130: a first discharge line
200: a devolatilizer 210: a second supply line
220: a second solvent discharge line 230: a second discharge line
240: a pre-heater

The invention claimed is:

1. A method for separating polybutene, the method comprising:

(1) introducing a polybutene solution into a distillation column, wherein the polybutene solution comprises polybutene, a halogenated hydrocarbon solvent, and a non-polar hydrocarbon solvent and the polybutene solution has a viscosity of 1 cp to 50 cp as measured at 25° C. using a rotational viscometer;

(2) collecting an upper stream comprising the halogenated hydrocarbon solvent and a portion of the non-polar hydrocarbon solvent from an upper portion of the distillation column, and collecting a lower stream comprising the polybutene and a remaining portion of the non-polar hydrocarbon solvent from a lower portion of the distillation column, wherein the lower stream has a viscosity of 10 cp to 150 cp; and (3) separating the remaining portion of the non-polar hydrocarbon solvent and the polybutene from the lower stream, wherein a reflux ratio of the distillation column in Step (2) is 0.1 to 1.

2. The method of claim 1, wherein the polybutene solution has a solid content of 10 wt % to 25 wt %.

3. The method of claim 1, wherein upper stream comprises the halogenated hydrocarbon solvent and the portion of the non-polar hydrocarbon solvent in a weight ratio of 20:80 to 80:20.

4. The method of claim 1, wherein the lower stream has a viscosity of 15 cp to 120 cp.

5. The method of claim 1, wherein the lower stream further comprises the halogenated hydrocarbon solvent in an amount of 100 ppm to 5,000 ppm.

6. The method of claim 1, wherein, in Step (2), a temperature of the upper portion of the distillation column is 50° C. to 70° C. and a temperature of the lower portion of the distillation column is 85° C. to 105° C.

7. The method of claim 1, wherein a pressure of the distillation column in Step (2) is 1.5 bar to 3 bar.

8. The method of claim 1, wherein a solid content of the lower stream is from 40 wt % to 60 wt %.

9. The method of claim 1, wherein the separating of the remaining portion of the non-polar hydrocarbon solvent and the polybutene from the lower stream comprises: introducing the lower stream into a devolatilizer, collecting the remaining portion of the non-polar hydrocarbon solvent from an upper portion of the devolatilizer and collecting the polybutene from a lower portion of the devolatilizer.

10. The method of claim 9, further comprising passing the lower stream through a pre-heater before introducing the lower stream into the devolatilizer.

11. The method of claim 9, wherein a temperature of the devolatilizer is 180° C. to 320° C. and a pressure of the devolatilizer is 0.4 bar to 1.2 bar.

12. The method of claim 1, wherein the polybutene separated in Step (3) comprises the halogenated hydrocarbon solvent in an amount of 5 ppm or less and the non-polar hydrocarbon solvent in an amount of 0.05 wt % or less.

13. The method of claim 1, wherein the halogenated hydrocarbon solvent is one or more selected from the group consisting of chloromethane, dichloromethane, trichloromethane, 1-chloro butane and chloro benzene.

14. The method of claim 1, wherein the non-polar hydrocarbon solvent is one or more selected from the group consisting of butane, pentane, neo pentane, hexane, cyclohexane, methyl cyclohexane, heptane, octane, benzene, toluene, xylene and ethyl benzene.

* * * * *